(12) United States Patent
Richter et al.

(10) Patent No.: US 11,479,344 B2
(45) Date of Patent: Oct. 25, 2022

(54) METHODS AND SYSTEMS FOR FALL BACK FLIGHT CONTROL CONFIGURED FOR USE IN ELECTRIC AIRCRAFT

(71) Applicant: BETA AIR, LLC, South Burlington, VT (US)

(72) Inventors: Timothy Gerard Richter, Wynantskill, NY (US); Andrew Giroux, Georgia, VT (US); Joseph Trovato, Winooski, VT (US); Chris Townsend, Shelburne, VT (US)

(73) Assignee: BETA AIR, LLC, South Burlington, VT (US)

( * ) Notice: Subject to any disclaimer, the term of this patent is extended or adjusted under 35 U.S.C. 154(b) by 66 days.

(21) Appl. No.: 17/179,826

(22) Filed: Feb. 19, 2021

(65) Prior Publication Data
US 2022/0266985 A1 Aug. 25, 2022

(51) Int. Cl.
*G05D 1/00* (2006.01)
*B64C 13/50* (2006.01)

(52) U.S. Cl.
CPC .......... *B64C 13/503* (2013.01); *B64C 13/505* (2018.01); *G05D 1/0077* (2013.01)

(58) Field of Classification Search
CPC .... B64C 13/503; B64C 13/505; G05D 1/0077
See application file for complete search history.

(56) References Cited

U.S. PATENT DOCUMENTS

| | | | |
|---|---|---|---|
| 4,598,890 A * | 7/1986 | Herzog | B64C 13/505 244/230 |
| 7,789,345 B2 | 9/2010 | Matsui | |
| 8,016,243 B2 | 9/2011 | Beaufrere | |
| 8,068,943 B2 | 11/2011 | Manfred | |
| 8,235,328 B2 | 8/2012 | Hirvonen | |
| 8,534,599 B2 | 9/2013 | Noll | |
| 8,725,321 B2 | 5/2014 | Hagerott | |
| 8,818,575 B2 | 8/2014 | Lin | |
| 9,081,372 B2 | 7/2015 | Fervel | |

(Continued)

OTHER PUBLICATIONS

Web Site: http://altarica-association.org/ressources/ARBib/BernardAubertBieberMerliniMetge2007-ExperimentsInModelBasedSafety.pdf Title: Experiments in Model Based Safety Analysis: Flight Controls Date: Mar. 3, 2016 By: Bernard.

*Primary Examiner* — Ian Jen
(74) *Attorney, Agent, or Firm* — Caldwell Intellectual Property Law (57) ABSTRACT

A system of fall back flight control configured for use in electric aircraft includes an input control configured to receive a pilot input and generate a control datum. System includes a flight controller communicatively coupled to the input control and configured to receive the control datum and generate an output datum. The system includes the actuator having a primary mode in which the actuator is configured to move the at least a portion of the electric aircraft as a function of the output datum and a fall back mode in which the actuator is configured to move the at least a portion of the aircraft as a function of the control datum. The actuator configured to receive the control datum, receive the output datum, detect a loss of communication with the flight controller, and select the fall back mode as a function of the detection.

20 Claims, 5 Drawing Sheets

(56) References Cited

U.S. PATENT DOCUMENTS

| | | |
|---|---|---|
| 9,327,825 B2 | 5/2016 | White |
| 11,281,237 B1 * | 3/2022 | Giroux ................. B64C 13/503 |
| 2014/0303812 A1 | 10/2014 | Avritch |

* cited by examiner

METHODS AND SYSTEMS FOR FALL BACK FLIGHT CONTROL CONFIGURED FOR USE IN ELECTRIC AIRCRAFT

FIELD OF THE INVENTION

The present invention generally relates to the field of electric aircraft. In particular, the present invention is directed to methods and systems for fall back flight control configured for use in electric aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect, a system of fall back flight control configured for use in electric aircraft includes an input control configured to receive a pilot input and generate a control datum as a function of the pilot input. The system includes a flight controller communicatively coupled to the input control and configured to receive the control datum from the input control and generate an output datum as a function of the control datum. The system includes an actuator, the actuator communicatively coupled to the input control and the flight controller, the actuator having a primary mode in which the actuator is configured to move the at least a portion of the electric aircraft as a function of the output datum and a fall back mode in which the actuator is configured to move the at least a portion of the aircraft as a function of the control datum. The actuator further configured to receive the control datum from the input control, receive the output datum from the flight controller, detect a loss of communication with the flight controller, and select the fall back mode as a function of the detection.

In another aspect a method of fall back flight control configured for use in electric aircraft includes receiving, at an input control, a pilot input, generating, at the input control, a control datum as a function of the pilot input, receiving, at a flight controller, the control datum from the input control, generating, at the flight controller, an output datum as a function of the control datum, receiving, at an actuator, the control datum from the input control, receiving, at the actuator, the output datum from the flight controller, detecting, at the actuator, as a function of time, loss of communication with the flight controller, and selecting, by the actuator, the fall back mode as a function of the detection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
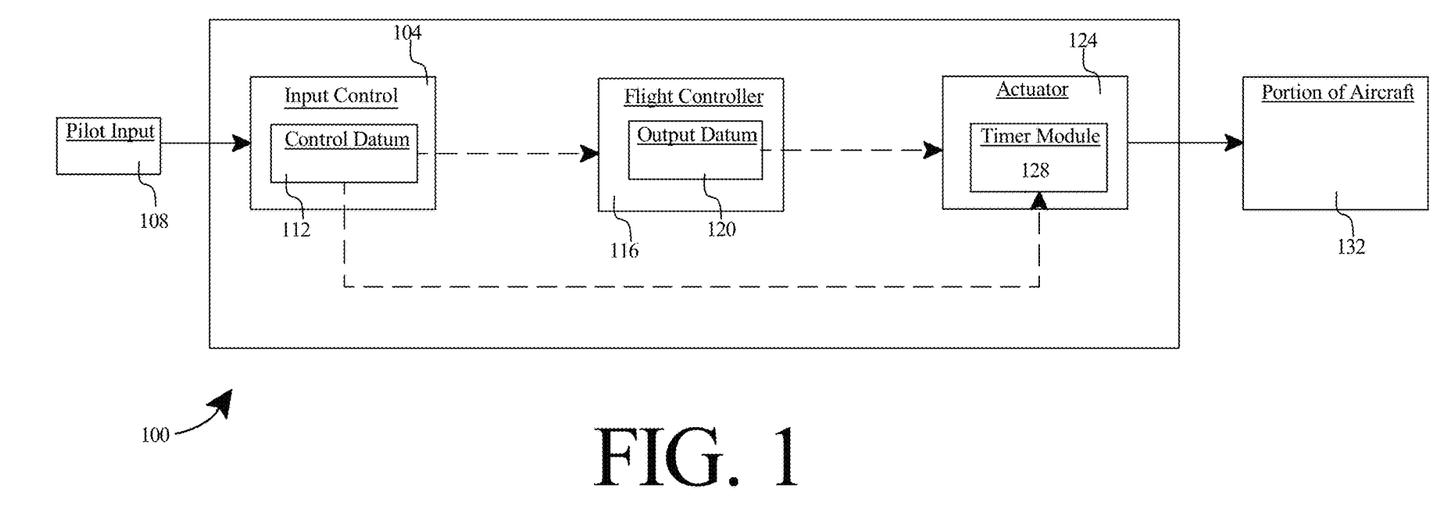
FIG. 1 is an illustrative embodiment of a system for fall back flight control configured for use in electric aircraft presented in block diagram form.

Fall back flight control system 100 includes input control 104. Input control 104 may include a throttle lever, inceptor stick, collective pitch control, steering wheel, brake pedals, pedal controls, toggles, joystick. One of ordinary skill in the art, upon reading the entirety of this disclosure would appreciate the variety of input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Additionally, or alternatively, input control 104 may include one or more data sources providing raw data. "Raw data", for the purposes of this disclosure, is data representative of aircraft information that has not been conditioned, manipulated, or processed in a manner that renders data unrepresentative of aircraft information. Input control 104 may be exterior sensor data, interior sensor data, data retrieved from one or more remotely or onboard computing devices. Input control 104 may include audiovisual data, pilot voice data, biometric data, or a combination thereof. Input control 104 may include information or raw data gathered from gyroscopes, inertial measurement units (IMUs), motion sensors, a combination thereof, or another sensor or grouping of sensors. The IMU may, in non-limiting embodiments, may broadcast attitude information relating to the aircraft for use by one or more other components in the system 100. For example, and without limitation, the broadcast attitude information by IMU may be used as input control 104 for use by one or more inverters and combined with input controls 104 for a reduced control. Input control 104 may be physically located in the cockpit of the aircraft or remotely located outside of the aircraft in another location communicatively coupled to at least a portion of the aircraft. "communicatively couple", for the purposes of this disclosure, is a process whereby one device, component, or circuit is able to receive data from and/or transmit data to another device, component, or circuit; communicative coupling may be performed by wired or wireless electronic communication, either directly or by way of one or more intervening devices or components. In an embodiment, communicative coupling includes electrically coupling an output of one device, component, or circuit to an input of another device, component, or circuit. Communicative coupling may be performed via a bus or other facility for intercommunication between elements of a computing device. Communicative coupling may include indirect connections via "wireless" connection, low power wide area network, radio communication, optical communication, magnetic, capacitive, or optical coupling, or the like.

Input control 104 may include buttons, switches, or other binary inputs in addition to, or alternatively than digital controls about which a plurality of inputs may be received. Input control 104 is configured to receive pilot input 108. Pilot input 108 may include a physical manipulation of a control like a pilot using a hand and arm to push or pull a lever, or a pilot using a finger to manipulate a switch. Pilot input 108 may include a voice command by a pilot to a microphone and computing system consistent with the entirety of this disclosure. Input control 104 is configured to generate a control datum 112 as a function of pilot input 108. "Datum", for the purposes of this disclosure, refers to at least an element of data identifying and/or a pilot input or command. Input control 104 may be communicatively connected to any other component presented in system, the communicative connection may include redundant connections configured to safeguard against single-point failure. Control datum 112 may indicate a pilot's desire to change the heading or trim of an electric aircraft. Control datum 112 may indicate a pilot's desire to change an aircraft's pitch, roll, yaw, or throttle. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about it's longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input 112, when referring to throttle, may refer to a pilot's desire to increase or decrease thrust produced by at least a propulsor. Control datum 112 may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Control datum 112 may include circuitry, computing devices, electronic components or a combination thereof that translates pilot input 112 into at least an electronic signal configured to be transmitted to another electronic component.

With continued reference to FIG. 1, fall back flight control system 100 includes flight controller 116. Flight controller 116 is communicatively coupled to input control 104 and configured to receive control datum 112 from input control 104. "Flight controller", for the purposes of this disclosure, refers to a component or grouping of components that control trajectory of the electric aircraft by taking in signals from a pilot and output signals to at least a propulsor and other portions of the electric aircraft like control surfaces to adjust trajectory. Flight controller may mix, refine, adjust, redirect, combine, separate, or perform other types of signal operations to translate pilot desired trajectory into aircraft maneuvers. Flight controller, for example, may take in a pilot input of moving an inceptor stick, the signal from that move may be sent to flight controller, which performs any number or combinations of operations on those signals, then sends out output signals to any number of aircraft components that work in tandem or independently to maneuver the aircraft in response to the pilot input. Flight controller may condition signals such that they can be sent and received by various components throughout the electric aircraft.

Additionally, flight controller may include and/or communicate with any computing device, including without limitation a microcontroller, microprocessor, digital signal processor (DSP) and/or system on a chip (SoC). Flight controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller may be designed and configured to operate electronic aircraft via fly-by-wire. Flight controller is communicatively coupled to each propulsor; as used herein, flight controller is communicatively coupled to each propulsor where flight controller is able to transmit signals to each propulsor and each propulsor is configured to modify an aspect of propulsor behavior in response to the signals. As a non-limiting example, flight controller may transmit signals to a propulsor via an electrical circuit connecting flight controller to the propulsor; the circuit may include a direct conductive path from flight controller to propulsor or may include an isolated coupling such as an optical or inductive coupling. Alternatively, or additionally, flight controller may communicate with a propulsor of plurality of propulsors 104*a*-*n* using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple flight controller to propulsors. Persons skilled in the art, upon reviewing the entirety of this disclosure, will be aware of various ways to monitor resistance levels and apply resistance to linear thrust control, as used and described herein.

Flight controller 116 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Fall back flight control system 100 may include a single computing device operating independently, or may include two or more computing device operating in concert, in parallel, sequentially or the like; two or more computing devices may be included together in a single computing device or in two or more computing devices. Flight controller 116 may interface or communicate with one or more additional devices as described below in further detail via a network interface device. Network interface device may be utilized for connecting flight controller 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 116 may include but is not limited to, for example, a computing device or cluster of computing devices in a first location and a second computing device or cluster of computing devices in a second location. Fall back flight control system 100 may include one or more computing devices dedicated to data storage, security, distribution of traffic for load balancing, and the like. Flight controller 116 may distribute one or more computing tasks as described below across a plurality of computing devices of computing device, which may operate in parallel, in series, redundantly, or in any other manner used for distribution of tasks or memory between computing devices. Flight controller 116 may be implemented using a "shared nothing" architecture in which data is cached at the worker, in an embodiment, this may enable scalability of flight controller 116 and/or computing device.

Flight controller 116 may be designed and/or configured to perform any method, method step, or sequence of method steps in any embodiment described in this disclosure, in any order and with any degree of repetition. For instance, flight controller 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 116, as well as any other component present within disclosed systems, as well as any other components or combination of components may be connected to a controller area network (CAN) which may interconnect all components for signal transmission and reception.

Flight controller 116 is configured to generate an output datum 120 as a function of the control datum 112. Output datum 120 may include an electrical signal consistent with the description of electrical signals regarding control datum 116. Output datum 120 includes an electrical signal configured to be transmitted to at least a portion of the aircraft, namely an actuator mechanically coupled to at least a portion of the aircraft that manipulates a fluid medium to change an aircraft's pitch, roll, yaw, or throttle.

With continued reference to FIG. 1, fall back flight control system 100 includes actuator 124 which is communicatively coupled to the input control 104 and flight controller 116. Actuator 124 may include a computing device or plurality of computing devices consistent with the entirety of this disclosure. Actuator 124 may be designed and/or configured to perform any method, method step, or sequence of method steps in any embodiment described in this disclosure, in any order and with any degree of repetition. For instance, flight actuator 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Actuator 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Actuator 124 may include a piston and cylinder system configured to utilize hydraulic pressure to extend and retract a piston coupled to at least a portion of electric aircraft. Actuator 124 may include a stepper motor or server motor configured to utilize electrical energy into electromagnetic movement of a rotor in a stator. Actuator 124 may include a system of gears coupled to an electric motor configured to convert electrical energy into kinetic energy and mechanical movement through a system of gears. Actuator 124 may include one or more inverters capable of driving one or more propulsors consistent with the entirety of this disclosure utilizing the herein disclosed system. Actuator 124, one of the combination of components thereof, or another component configured to receive data from flight controller 116 and input control 104, if loss of communication is detected, may be configured to implement a reduced function controller. The reduced function controller may directly react directly to input control 104, or other raw data inputs, as described in the entirety of this disclosure. Actuator 124 may include components, processors, computing devices, or the like configured to detect, as a function of time, loss of communication with flight controller 116. Actuator 124 may include timer module 128 configured to time all communication to and from actuator 124 and in particular, to detect that flight controller 124 has not transmitted output datum 120 to actuator 124 within a particular time limit, and thus, communication is likely lost. Timer module 128 may then be configured to receive control datum 112 directly from input control 104. The amount of time that timer module 128 keeps track of before switching actuator input to control datum 112 command may be configurable to a preset time, a time of day, or a time input by another component in fall back control system 100. Actuator 124 is configured to receive control datum 112 from input control 104 and receive output datum 120 from flight controller 116. Actuator 124 is configured to move at least a portion of the electric aircraft as a function of output datum 120. Output datum 120 indicates a desired change in aircraft heading or thrust, flight controller 116 translates control datum 112 into output datum 120. That is to say that flight controller 116 is configured to translate a pilot input, in the form of moving an inceptor stick, for example, into electrical signals to at least an actuator 124 that in turn, moves at least a portion of the aircraft in a way that manipulates a fluid medium, like air, to accomplish the pilot's desired maneuver. At least a portion of the aircraft that the actuator 124 moves may be a control surface.

With continued reference to FIG. 1, actuator 124 has a primary mode wherein the actuator is configured to move at least a portion of the aircraft as a function of the output datum 120 received from flight controller 116. The actuator 124 has a fall back mode wherein the actuator is configured to move at least a portion of the aircraft as a function of the control datum 112 received from input control 104. Actuator 124 is configured to detect loss of communication with flight controller 116, as a function of time, and select, as a function of the detection, the fall back mode. Actuator 124 is configured to move control surfaces of the aircraft in one or both of its two main modes of locomotion, or adjust thrust produced at any of the propulsors. These electronic signals can be translated to aircraft control surfaces. These control surfaces, in conjunction with forces induced by environment and propulsion systems, are configured to move the aircraft through a fluid medium, an example of which is air. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

In an embodiment, actuator 124 may be mechanically coupled to a control surface at a first end and mechanically coupled to an aircraft at a second end. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft.

At least a portion of an electric aircraft may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

In an embodiment, at least a portion of the aircraft may include a propulsor, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Figure 2:
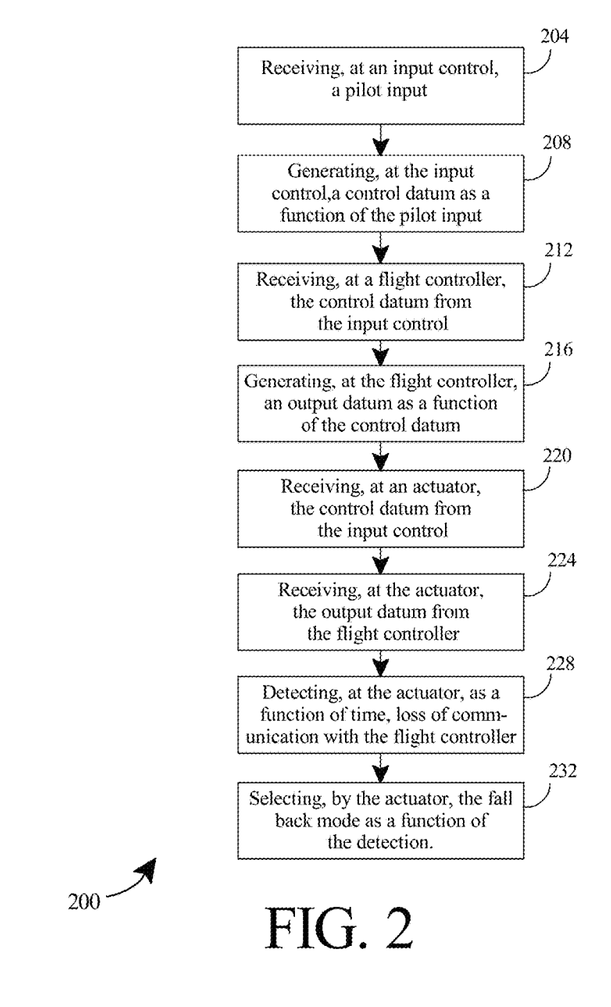
FIG. 2 is an illustrative embodiment of a method for flight control configured for use in electric aircraft presented in a flow chart.

Referring now to FIG. 2, a method of fall back flight control 200 configured for use in electric aircraft is presented in flow chart form. At 204, input control 104 receives pilot input 108. Input control 104 is communicatively coupled to flight controller 116. Input control 104 is communicatively coupled to actuator 124. Flight controller 116 is communicatively coupled to actuator 124.

At 208, input control 104 generates control datum 112 as a function of pilot input 108. The control datum 112 may include an electrical signal. The control datum may be any control datum as described herein. The electrical signal may be any electrical signal as described herein.

At 212, flight controller 116 receives control datum 112 from input control 108. At 216, flight controller 116 generates output datum 120 as a function of control datum 112. The output datum 120 may include an electrical signal. The control datum may be any control datum as described herein. The input control may be any input control as described herein. The electrical signal may be any electrical signal as described herein.

At 216, flight controller 116 generates the output datum 120 as a function of the control datum 112. Output datum may be any output datum as described herein. Flight controller may be any flight controller as described herein. Control datum may be any control datum as described herein.

At 220, actuator 124 receives the control datum 112 from the input control 104. Actuator 124 may be configured to convert control datum 112 into mechanical movement of at least a portion of the electric aircraft. The actuator may be any actuator as described herein. Input control may be any input control as described herein. The control datum may be any control datum as described herein.

At 224, actuator 124 receives the output datum 120 from flight controller 116. At 228, actuator 124 moves at least a portion of electric aircraft as a function of output datum 120.

At 228, actuator 124, and more specifically timer module 128, detects loss of communication with flight controller 116. Detection may be triggered by an elapsed time greater than a set time amount where output datum 120 is not received from flight controller 116 at actuator 124. Time threshold that timer module 128 lets elapse before detection of loss of communication with flight controller 116 may be input by a pilot. Time threshold that timer module 128 lets elapse before detection of loss of communication with flight controller 116 may be configurable to be variable depending on aircraft function or mission, or a combination of other factors. Additionally, or alternatively, flight controller 116 may output a constant signal to actuator 124 at a certain frequency and or voltage level, which indicates communication is established between actuator and flight controller. Actuator 124 may detect if signal is not maintained which would indicate communication is lost between flight controller 116 and actuator 124. Constant signal frequency may be high or low, and therefore communication loss would be indicated by the lowering or raising of signal frequency, respectively. In another non-limiting example, actuator 124 may send an initial signal to flight controller 116 and in turn receive a signal back from flight controller 116 to indicate connection is established. If flight controller 116 does not send a return signal to actuator 124, actuator would detect that communication is lost with flight controller 116.

At 232, if loss of communication with flight controller 216 is detected, actuator 124 selects fall back mode. Fall back mode may include actuator 124 moving at least a portion of the aircraft directly as a function of control datum 112. Actuator 124 may move at least a portion of electric aircraft as a function of control datum 112 and in response to specific pilot input 108 to input control 104, which, in a non-limiting example, may be the pilot moving an inceptor stick to the right, indicating a command to roll the aircraft to the right.

Figure 3:
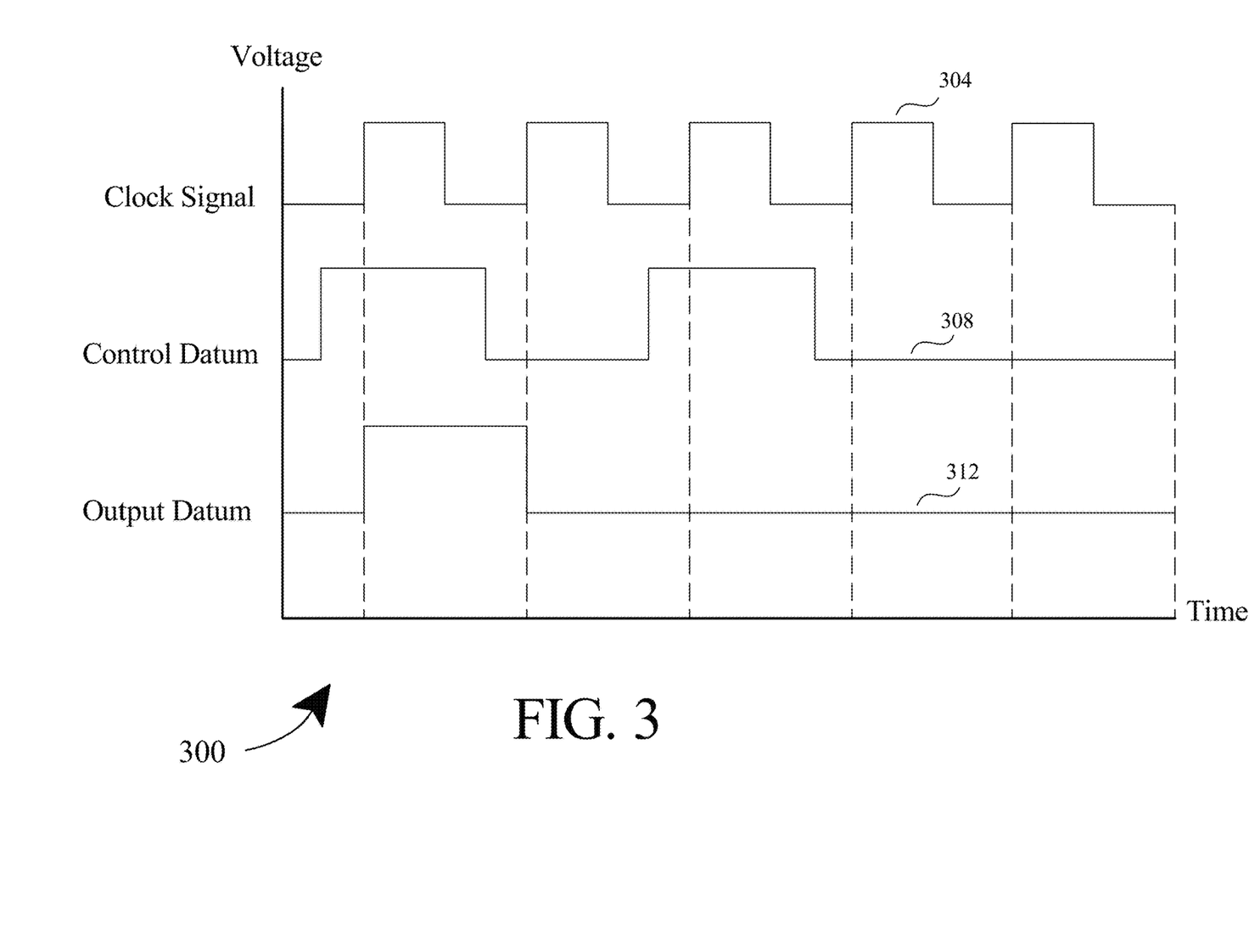
FIG. 3 is an illustrative embodiment of electronic signals that may be present in system for fall back flight control configured for use in electric aircraft.

Referring now to FIG. 3, an embodiment of a plurality of signals plotted as voltage vs. time is presented. Clock signal 304 may be generated by timer module 128. Timer module 128 may generate a square wave in regular intervals. Control Datum Signal 308 may be present at any time during the operation of the herein disclosed system. Control datum signal 308 may be sent to flight controller 116. In response, output datum signal 312 may be generated and sent to actuator 124. Output datum signal 312 may be generated at the same instant as high voltage edge of clock signal 304. Output datum 312 being sent in response to control datum 308, may indicate that communication is established and active between flight controller 116 and actuator 124. In another non-limiting example, if output datum 312 is not generated, within a certain limit of clock signal 304 pulses, timer module 128 may count the clock signal 304 pulses to indicate communication is lost. Clock signal 304 is for reference only, and it should not be construed by one of ordinary skill in the art that this precludes utilizing synchronous or asynchronous logic or analog circuits or circuit components within system, namely the flight controller, actuator or others. In other words, a timer, oscillator, clock circuit may be used to detect intervals between signals, but no combination or configuration is precluded from use by the present disclosure. For example, if output datum signal 312 is not generated in response to control datum 308 within four clock signal 304 pulses, timer module 128 would detect communication is lost. The preceding example is illustrated in the right-most portion of FIG. 3, where a second control datum signal 308 includes a second pulse, but unlike the active communication scenario, there is no output datum pulse 312 in response, and thus, timer module 128 would detect that communication with flight controller 116 has been lost. In FIG. 3, clock signal 304 pulses are represented by dashed vertical lines.

Figure 4:
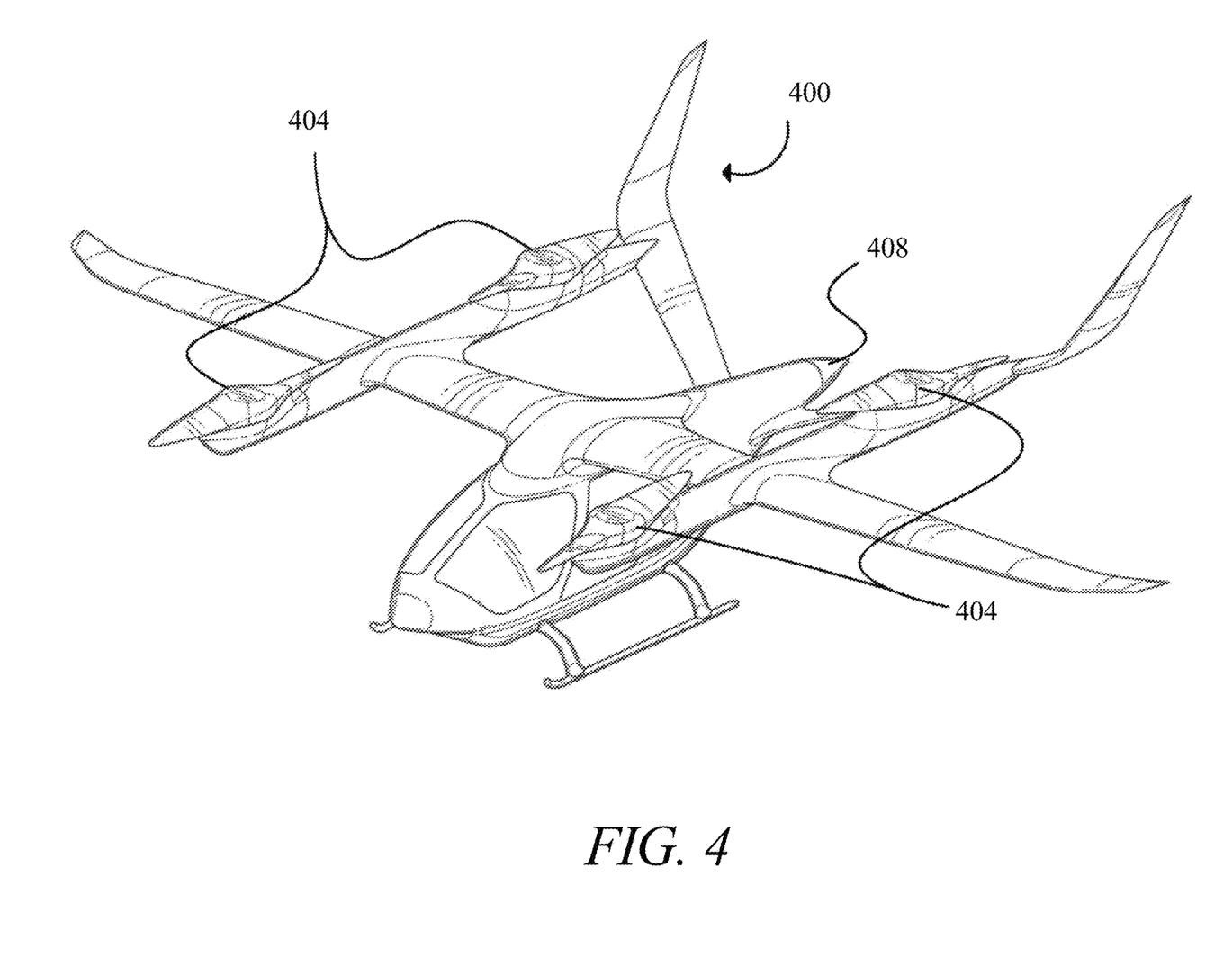
FIG. 4 is an illustration of an embodiment of an electric aircraft.

Referring now to FIG. 4, an embodiment of an electric aircraft 400 is presented. Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on an electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of an electric aircraft 400, including without limitation propulsors and/or propulsion assemblies. In an embodiment, the motor may eliminate need for many external structural features that otherwise might be needed to join one component to another component.

The motor may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Referring now to FIG. 4, an exemplary embodiment of a dual-mode aircraft 400 that may incorporate assembly as illustrated. Aircraft may include at least a vertical propulsor 404 and at least a forward propulsor 408. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in a upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 404 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

At least a forward propulsor 408 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 404 and at least a forward propulsor 408 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

During flight, a number of forces may act upon the electric aircraft. Forces acting on an aircraft 400 during flight may include thrust, the forward force produced by the rotating element of the aircraft 400 and acts parallel to the longitudinal axis. Drag may be defined as a rearward retarding force which is caused by disruption of airflow by any protruding surface of the aircraft 400 such as, without limitation, the wing, rotor, and fuselage. Drag may oppose thrust and acts rearward parallel to the relative wind. Another force acting on aircraft 400 may include weight, which may include a combined load of the aircraft 400 itself, crew, baggage and fuel. Weight may pull aircraft 400 downward due to the force of gravity. An additional force acting on aircraft 400 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
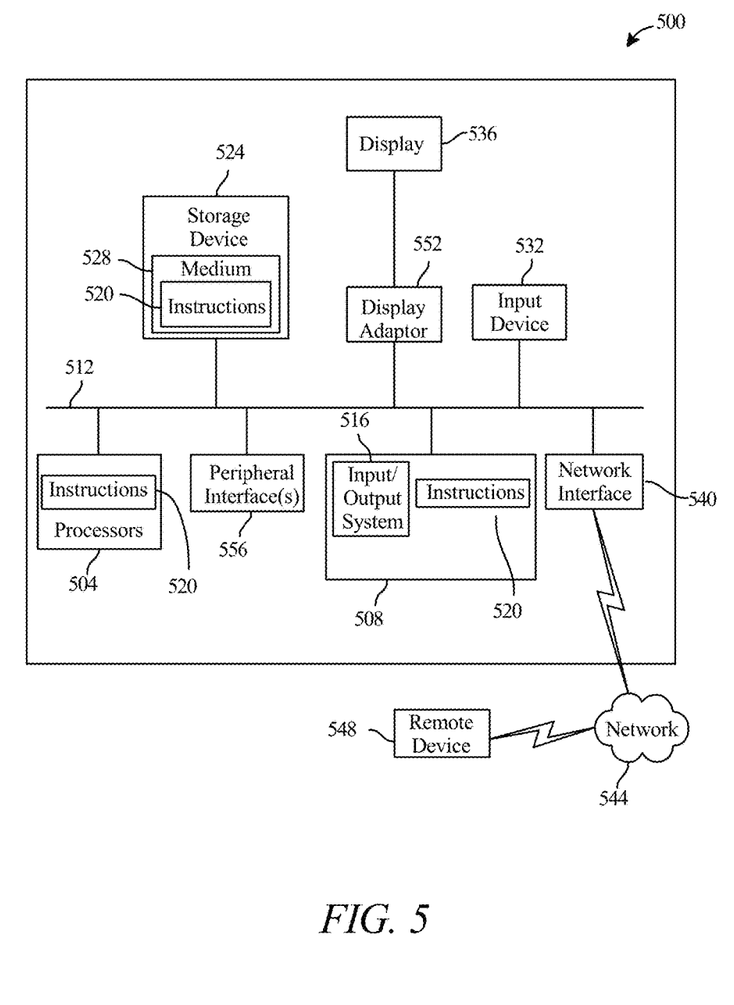
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIRE-WIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of fall back flight control configured for use in electric aircraft, the system comprising:
   an input control, the input control configured to:
      receive a pilot input;
      generate a control datum as a function of the pilot input;
   a flight controller, the flight controller communicatively coupled to the input control and configured to:
      receive the control datum from the input control;
      generate an output datum as a function of the control datum;
   an actuator, the actuator communicatively coupled to the input control and the flight controller, the actuator having a primary mode in which the actuator is configured to move the at least a portion of the electric aircraft as a function of the output datum and a fall back mode in which the actuator is configured to move the at least a portion of the aircraft as a function of the control datum, the actuator further configured to:
      receive the control datum from the input control;
      receive the output datum from the flight controller;
      detect a loss of communication with the flight controller; and
      select the fall back mode as a function of the detection.

2. The system of claim 1, wherein the pilot input includes a manual manipulation of an inceptor stick.

3. The system of claim 1, wherein the pilot input includes a manual manipulation of a throttle.

4. The system of claim 1, wherein the actuator includes a piston and cylinder.

5. The system of claim 1, wherein the actuator includes a servomotor.

6. The system of claim 1, wherein moving the at least a portion of the aircraft changes at least one of a pitch, roll, yaw, and throttle of the electric aircraft.

7. The system of claim 1, wherein the detection of the loss of communication is a function of time wherein output datum is not detected by the actuator.

8. The system of claim 1, wherein the at least a portion of the aircraft includes a propulsor.

9. The system of claim 1, wherein the at least a portion of the aircraft includes a control surface.

10. The system of claim 1, wherein the actuator includes a device configured to convert electrical signals into mechanical movement.

11. The system of claim 1, wherein the actuator is configured to detect, as a function of time, that communication with the flight controller is lost by determining a maximum amount of time without receiving the output datum from the flight controller.

12. A method of fall back flight control configured for use in electric aircraft, the method comprising:
   receiving, at an input control, a pilot input;
   generating, at the input control, a control datum as a function of the pilot input;
   receiving, at a flight controller, the control datum from the input control;
   generating, at the flight controller, an output datum as a function of the control datum;

receiving, at an actuator, the control datum from the input control;

receiving, at the actuator, the output datum from the flight controller;

detecting, at the actuator, as a function of time, loss of communication with the flight controller; and selecting, by the actuator, the fall back mode as a function of the detection.

13. The method of claim 12, wherein the control datum includes electrical signals.

14. The method of claim 12, wherein the output datum includes electrical signals.

15. The method of claim 12, wherein the actuator is configured to convert the control datum into mechanical movement of at least a portion of the electrical aircraft.

16. The method of claim 12, wherein the maximum time the actuator waits before detecting communication is lost with the flight controller may be input by a pilot.

17. The method of claim 12, wherein the maximum time the actuator waits before detecting communication is lost with the flight controller may be configurable.

18. The method of claim 12, wherein the input control is communicatively coupled to the flight controller.

19. The method of claim 12, wherein the input control is communicatively coupled to the actuator.

20. The method of claim 12, wherein the flight controller is communicatively coupled to the actuator.

\* \* \* \* \*